United States Patent

Omaru et al.

[11] Patent Number: 5,916,707
[45] Date of Patent: Jun. 29, 1999

[54] NONAQUEOUS-ELECTROLYTE SECONDARY BATTERY AND BATTERY CASE FOR LIMITING EXPANSION THEREOF DUE TO INTERNAL PRESSURE

[75] Inventors: Atsuo Omaru, Kanagawa; Akira Yamaguchi; Masayuki Nagamine, both of Fukushima, all of Japan

[73] Assignee: Sony Corporation, Tokyo, Japan

[21] Appl. No.: 08/747,615

[22] Filed: Nov. 13, 1996

[30] Foreign Application Priority Data

Nov. 15, 1995 [JP] Japan ................................. 7-297046
Dec. 13, 1995 [JP] Japan ................................. 7-324820
Jan. 11, 1996 [JP] Japan ................................. 8-003296

[51] Int. Cl.$^6$ .................................................. H01M 2/00
[52] U.S. Cl. ........................... 429/163; 429/94; 429/164; 429/176
[58] Field of Search ............................. 429/94, 163, 164, 429/176

[56] References Cited

U.S. PATENT DOCUMENTS 5,443,925  8/1995  Machida et al. ..................... 429/176

Primary Examiner—Arun S. Phasge
Assistant Examiner—Thomas H. Parsons
Attorney, Agent, or Firm—Hill & Simpson

[57] ABSTRACT

A nonaqueous-electrolyte secondary battery has an electrode assembly having positive and negative electrodes separated from each other by a porous resin separator, and a battery case having a side wall with at least one land projecting inwardly into the battery case or outwardly out of the battery case, the electrode assembly being disposed in the battery case. Alternatively, the battery case may have a plurality of walls and a plurality of round corners each joining adjacent two of the walls.

13 Claims, 9 Drawing Sheets

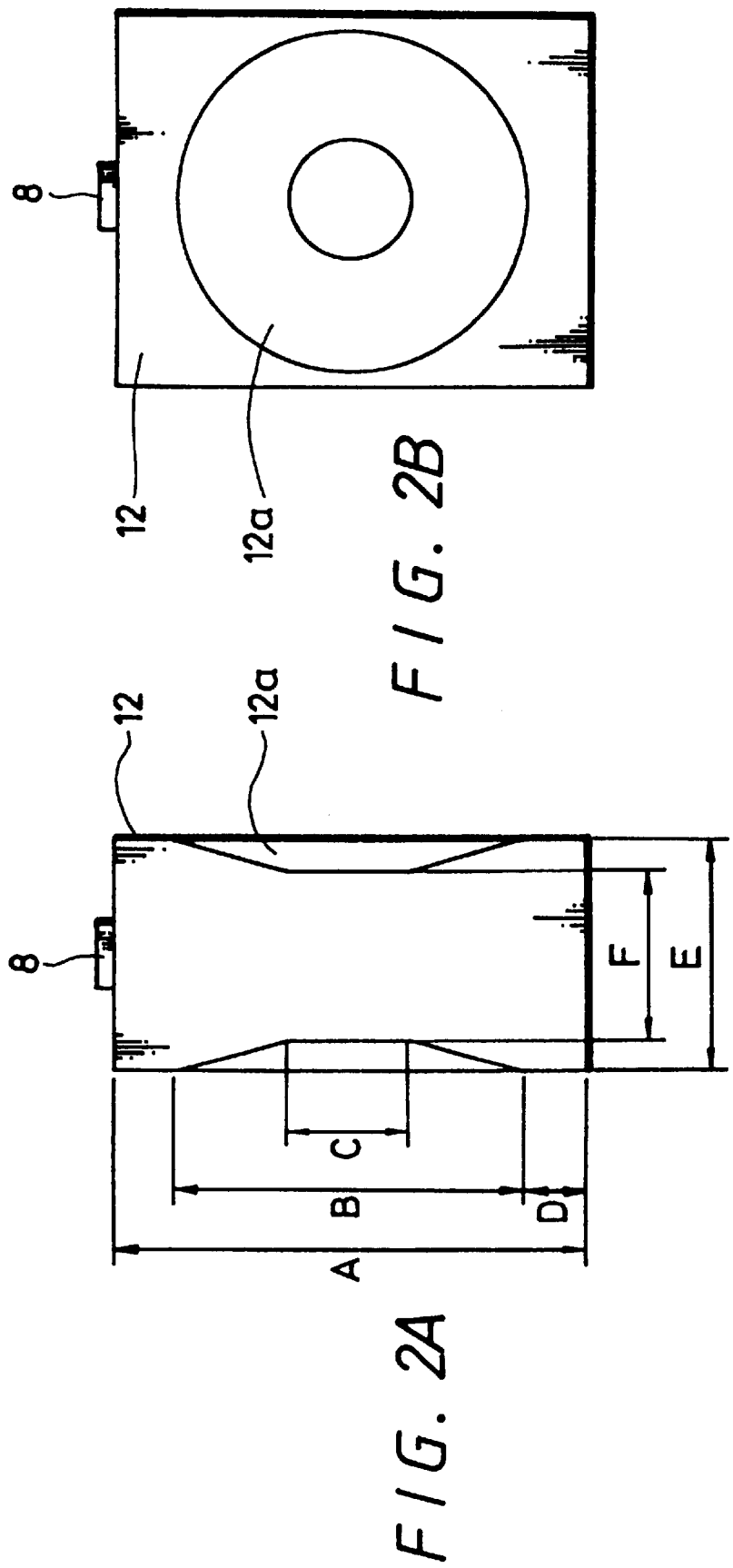

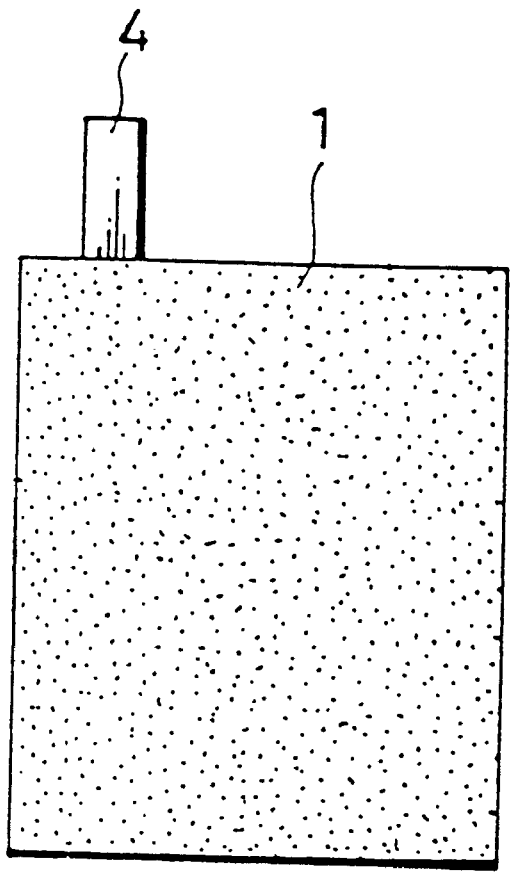 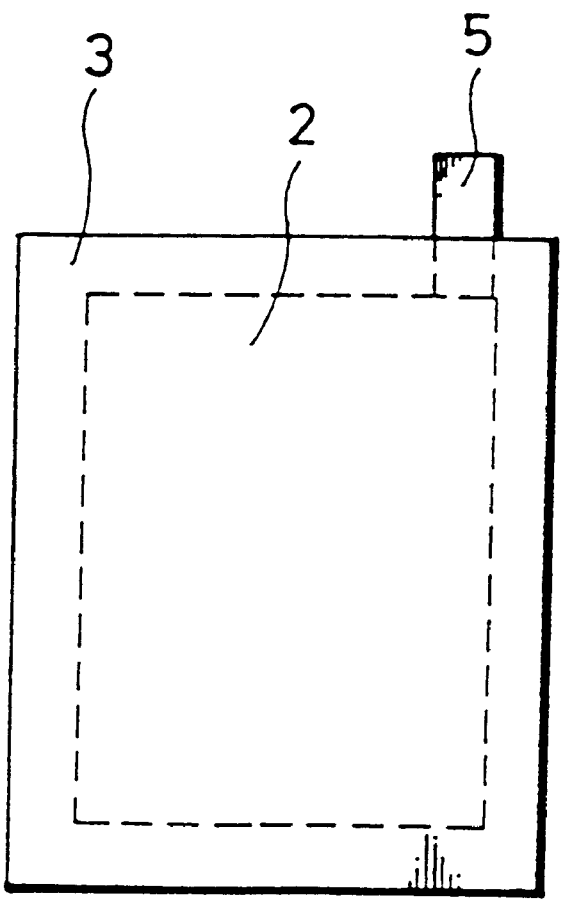
F I G. 5A          F I G. 5B

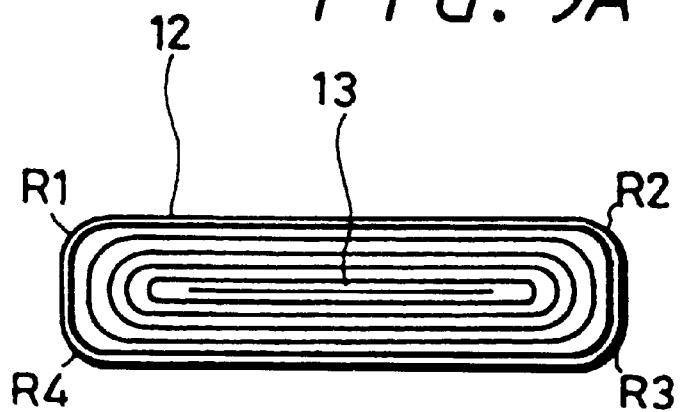
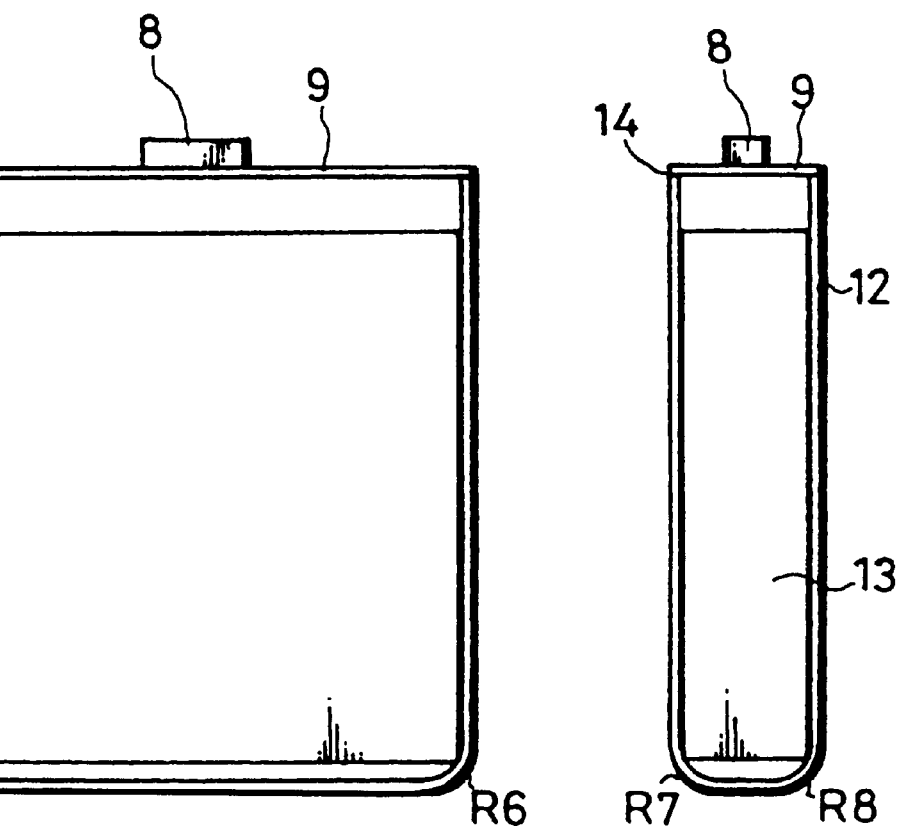

NONAQUEOUS-ELECTROLYTE SECONDARY BATTERY AND BATTERY CASE FOR LIMITING EXPANSION THEREOF DUE TO INTERNAL PRESSURE

BACKGROUND OF THE INVENTION

1. Field of the Invention

The present invention relates to a nonaqueous-electrolyte secondary battery for use as a power supply for a portable electronic device such as a video tape recorder combined with a video camera, a portable telephone set, a laptop computer, or the like 2. Description of the Prior Art Various portable electronic devices including video tape recorders combined with video cameras, portable telephone sets, laptop computers, etc. have recently been introduced into the market. As efforts are made to reduce the size and weight of those portable electronic devices, attention is attracted to secondary batteries for use as portable power supplies with the portable electronic devices, Research and development activities are being performed to achieve a higher level of energy density for such secondary batteries.

There has been proposed a lithium ion secondary battery which employs a nonaqueous electrolyte having a higher level of energy density than aqueous-electrolyte batteries including lead batteries, nickel-cadmium batteries, etc. Attempts have begun to manufacture lithium ion secondary batteries for practical applications.

Lithium ion secondary batteries include a cylindrical battery having spirally coiled electrodes housed in a cylindrical case and a rectangular battery having folded, rectangular laminated electrodes, or elliptically coiled electrodes housed in a rectangular case. As recent portable electronic devices become thinner, there is a growing demand for the rectangular battery which has a better space utilization efficiency than the cylindrical battery.

The small-size secondary batteries described above are required to be highly reliable in ordinary use and also in high-temperature environments such as automobiles during summer. Rectangular battery cases are liable to be deformed easily under an internal pressure buildup because their strength is smaller than cylindrical battery cases. Therefore, when a rectangular secondary battery which is housed in a portable electronic device is exposed to a high temperature and expanded due to an internal pressure buildup, then the rectangular secondary battery may not be removed from the portable electronic device or may cause damage to the portable electronic device. If such a rectangular secondary battery is designed in smaller dimensions to provide a marginal space therearound, then the energy density that is available from the rectangular secondary battery is so small that the rectangular secondary battery cannot operate for a sufficient period of time.

Lithium ion secondary batteries are charged and discharged when lithium ions are brought into and out of respective crystals of positive and negative electrode materials thereof. When the lithium ions are brought into and out of the crystals, the crystals are expanded and contracted, respectively The cylindrical case of cylindrical lithium ion secondary batteries is strong enough not to be deformed even when the positive and negative electrode materials are expanded. Therefore, when the positive and negative electrode materials are expanded, they are kept in intimate contact with each other, allowing lithium ions to move smoothly for excellent battery characteristics On the other hand, the rectangular case of rectangular lithium ion secondary batteries is easily deformed when the positive and negative electrode materials are expanded Since the deformation of the rectangular case takes place before the positive and negative electrode materials are brought into intimate contact with each other, the rectangular lithium ion secondary batteries fail to provide excellent battery characteristics.

SUMMARY OF THE INVENTION

It is therefore an object of the present invention to provide a nonaqueous-electrolyte secondary battery which has positive and negative electrodes that can be brought into intimate contact with each other for excellent battery characteristics when it is charged.

Another object of the present invention to provide a nonaqueous-electrolyte secondary battery which has a battery case prevented from being expanded and hence from damaging a portable electronic device in which it is used when exposed to a high-temperature environment, and has a high level of reliability and a high level of energy density.

According to an aspect of the present invention, there is provided a nonaqueous-electrolyte secondary battery comprising an electrode assembly having positive and negative electrodes separated from each other by a separator, and a battery case having a side wall with at least one land projecting inwardly into the battery case, the electrode assembly being disposed in the battery case.

The battery case has an inside case width along a direction across the side wall, the inside case width being at least 0.3 times and less than 1.09 times a thickness of the electrode assembly According to another aspect of the present invention, there is provided a nonaqueous-electrolyte secondary battery comprising an electrode assembly having positive and negative electrodes separated from each other by a separator; and a battery case made of a thin sheet and having a plurality of walls and a plurality of round corners each joining adjacent two of the walls.

The separator is made of a porous resin material, further comprising a nonaqueous electrolyte held in the battery case.

The nonaqueous electrolyte contains at least one material selected from the group consisting of ethylene carbonate, propylene carbonate, butylene carbonate, vinylene carbonate, sulfolanes, butyrolactones, valerolactones, diethyl carbonate, dimethyl carbonate, methyl ethyl carbonate, and methyl propyl carbonate According to still another aspect of the present invention, there is provided a nonaqueous-electrolyte secondary battery comprising an electrode assembly having positive and negative electrodes separated from each other by a separator, and a battery case having a side wall with at least one land projecting outwardly into the battery case, the electrode assembly being disposed in the battery case.

The separator is made of a porous resin material, and a nonaqueous electrolyte is held in the battery case.

In each of the above nonaqueous-electrolyte secondary batteries, the negative electrode is made of a carbon material which can be doped or undoped with lithium ions, and the positive electrode is made of a material expressed by $Li_xMO_y$ where M represents at least one material selected from the group consisting of Co, Ni, Mn, Fe, Al, V, and Ti.

Alternatively, the negative electrode is made of a graphite material which can be doped or undoped with lithium ions, and the positive electrode is made of a material expressed by $Li_xMO_y$, where M represents at least one material selected from the group consisting of Co, Ni, Mn, Fe, Al, V, and Ti.

BRIEF DESCRIPTION OF THE DRAWINGS

FIG. 2A is a side elevational view of the nonaqueous-electrolyte secondary battery shown in FIG. 1;

FIG. 2B is a front elevational view of the nonaqueous-electrolyte secondary battery shown in FIG. 1;

FIGS. 5A and 5B are plan views of negative and positive electrodes which are to be stacked in a battery case;

FIGS. 9A, 9B, and 9C are cross-sectional views of the nonaqueous-electrolyte secondary battery shown in FIG. 8.

DETAILED DESCRIPTION OF THE PREFERRED EMBODIMENTS

Figure 1:
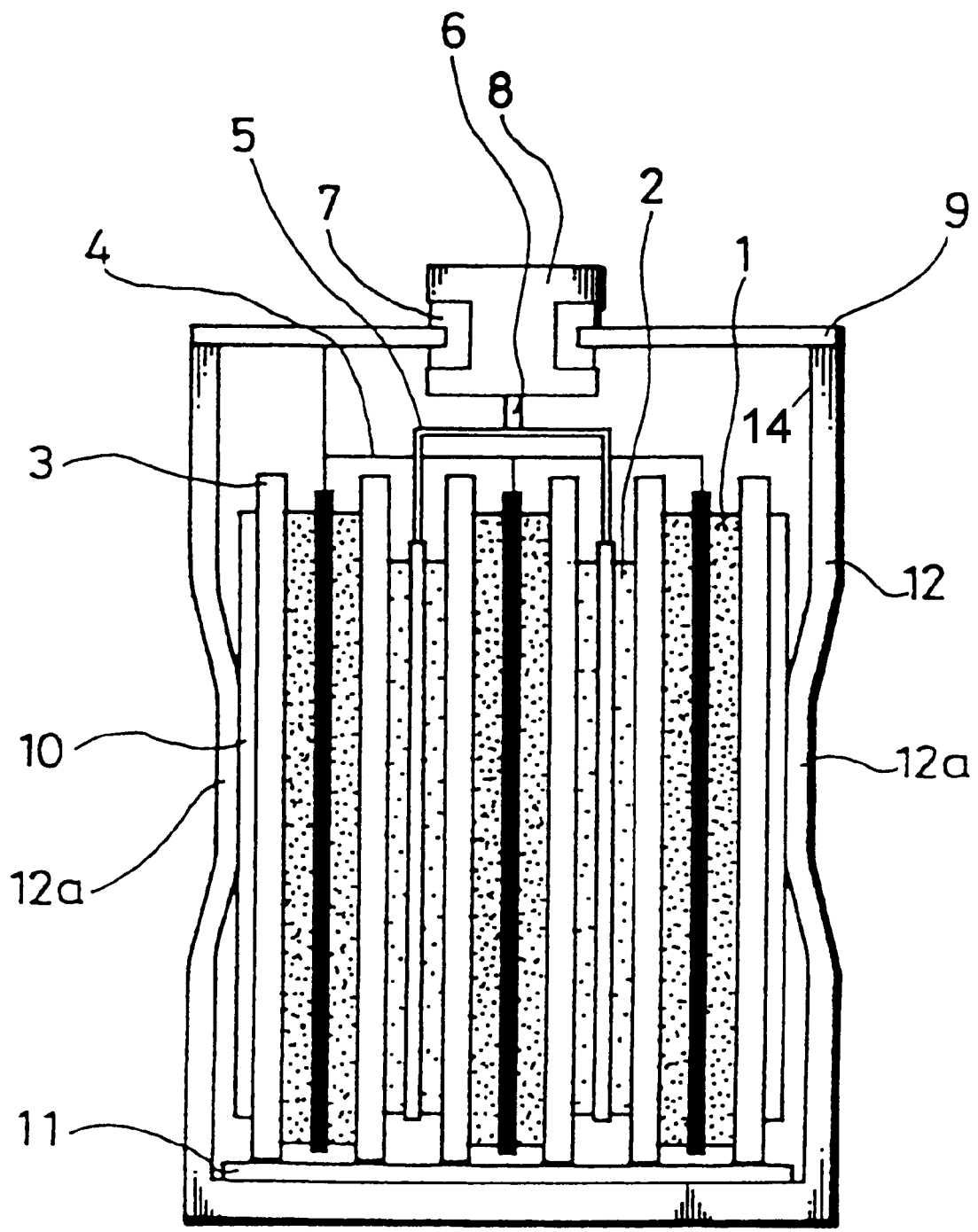
FIG. 1 is a cross-sectional view of a nonaqueous-electrolyte secondary battery according to a first embodiment of the present invention.

Like or corresponding reference numerals denote like or corresponding parts throughout views.

FIG. 1 shows a nonaqueous-electrolyte secondary battery according to an embodiment of the present invention.

As shown in FIG. 1, the nonaqueous-electrolyte secondary battery has a laminated electrode assembly comprising a plurality of alternate flat negative and positive electrodes 1, 2 separated from each other by flat separators 3. The electrode assembly is housed in a battery case 12 in the form of a hollow flat rectangular parallelepiped having an open end 14 closed by a battery lid 9. The negative electrodes 1 are connected to respective negative electrode leads 4 which are connected to the battery lid 9 that serves as a negative terminal. The positive electrodes 2 are connected to respective positive electrode leads 5 which are connected to an auxiliary lead 6 which is connected to a positive terminal 8 which is mounted centrally on the battery lid 9 by a gasket 7. The electrode assembly has an end held against an insulating sheet 11 placed on a bottom wall of the battery case 12 remote from the battery lid 9. The battery case 12 has a pair of opposite side walls, specifically larger side walls, dented inwardly to provide respective circular lands 12a that project inwardly toward each other. The electrode assembly has opposite side surfaces held against respective inner surfaces of the lands 12 through an adhesive tape 10.

The electrode assembly may alternatively comprise an elliptically coiled assembly of rectangular positive and negative electrodes.

As shown in FIGS. 2A and 2B, the battery case 12 has various dimensions A, B, C, D, E, F. The dimension A represents the length between an outer surface of the lid 9 and an outer surface of the bottom wall of the battery case 12. The dimension B represents the diameter of an outer circumferential edge of the lands 12a, and the dimension C represents the diameter of the crests of the lands 12a which project most inwardly into the batter case 12. The dimension D represents the width between the outer surface of the bottom wall of the battery case 12 and the outer circumferential edge of the lands 12a which is closest to the outer surface of the bottom wall. The dimension E represents the thickness between respective outer surfaces of the side walls of the battery case 1. The dimension F represents the distance (battery case thickness) between respective outer surfaces of the crests of the lands 12a which project most inwardly into the batter case 12.

The battery case 12 and the battery lid 9 may be made of any of various materials selected in view of their strength and machinability. For example, those materials may be iron, nickel, stainless steel, aluminum, etc., and may be plated to have a corrosion-resistant layer for protection against a nonaqueous electrolyte The battery case 12 in the form of a hollow flat rectangular parallelepiped may be manufactured according to any of various processes. For example, a thin sheet of metal may be shaped into the battery case 12 by drawing in a plurality of stages using at least one set of male and female dies. Before or after the sheet of metal is drawn, it may be pressed to form the lands 12a by another set of dies.

Figure 3A:
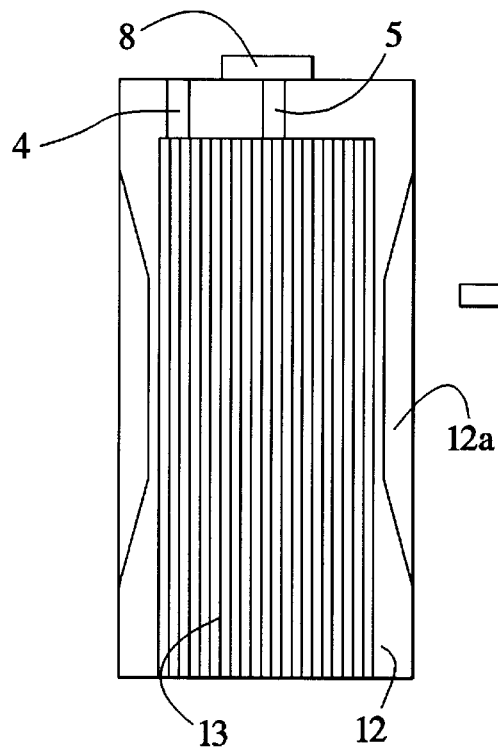
FIGS. 3A and 3B are cross-sectional views illustrative of the manner in which the nonaqueous-electrolyte secondary battery shown in FIG. 1 is expanded.
Figure 3B:
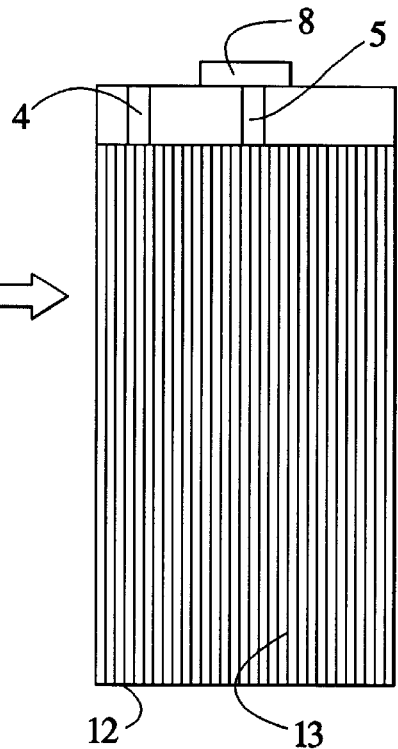
Figure 4A:
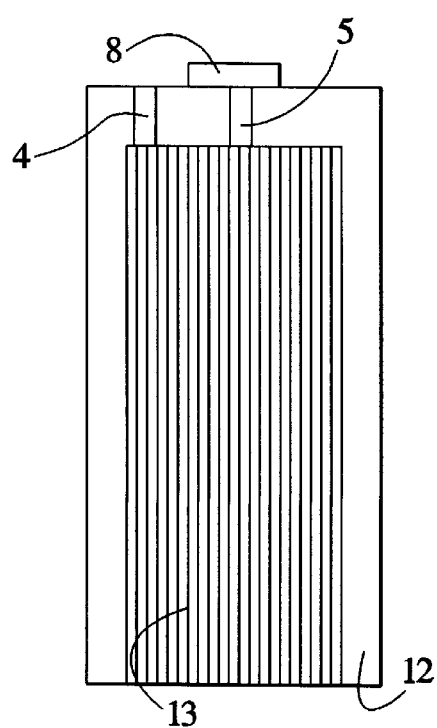
FIGS. 4A and 4B are cross-sectional views illustrative of the manner in which a conventional nonaqueous-electrolyte secondary battery is expanded.
Figure 4B:
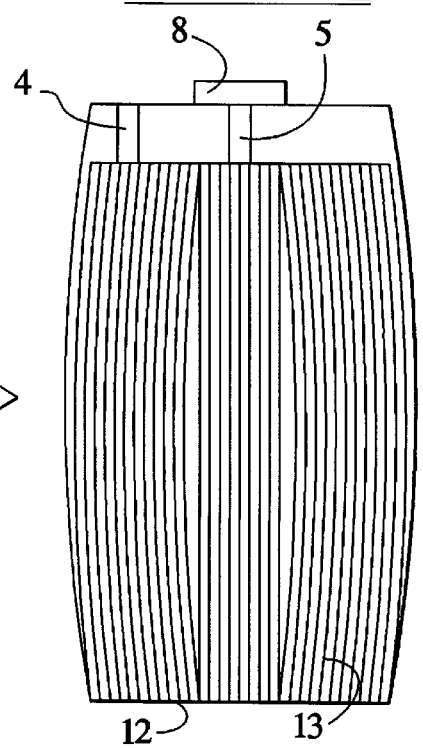

As shown in FIG. 3A, the electrode assembly, denoted by 13, is housed in the battery case 12 and sandwiched between the lands 12a. When the nonaqueous-electrolyte secondary battery is charged, the electrode assembly 13 is expanded, forcing the lands 12a outwardly, as shown in FIG. 3B. Since the lands 12a tend to spring back, forcing the electrode assembly 13 inwardly within the battery case 12, the battery case 12 itself does not expand and hence its thickness does not increase The negative and positive electrodes 1, 2 are brought into intimate contact with each other, allowing ions to move smoothly for excellent battery characteristics. Therefore, even when the nonaqueous-electrolyte secondary battery is exposed to high-temperature environments, the thickness of the battery case 12 is prevented from unduly increasing. Accordingly, the nonaqueous-electrolyte secondary battery does not damage or break a portable electronic device which employs the nonaqueous-electrolyte secondary battery, is highly reliable, and has a high level of energy density If the battery case 12 had no lands 12a as with a conventional nonaqueous-electrolyte secondary battery, as shown in FIG. 4A, then when the nonaqueous-electrolyte secondary battery is charged and the electrode assembly 13 is expanded, it would deform the battery case 13 outwardly, increasing its width as shown in FIG. 4B.

The negative electrodes 1 may be made any of various oxides having a relatively basic potential, including the oxide having a crystalline structure and/or a amorphous structure, iron oxide, ruthenium oxide, molybdenum oxide, tungsten oxide, titanium oxide, etc. or any of various carbon materials.

The carbon materials may be any carbon materials that are usually used in secondary batteries, but should preferably be carbon materials described below.

Carbon materials produced by firing organic materials to carbonize them may be used to form the negative electrodes 1.

The organic materials may be conjugated resins including phenolic resin, acrylic resin, halogenated vinyl resin, polyimide resin, polyamide-imide resin, polyamide resin, polyacetylene, poly(p-phenylene), etc., cellulose and its derivative, and any desired organic polymeric compounds.

The organic materials may also be condensed polycyclic hydrocarbon compounds including naphthalene, anthracene, triphenylene, pyrene, perylene, pentaphene, pentacene, or the like, derivatives thereof, e.g., their carboxylic acids, carboxylic acid anhydrides, carboxylic acid imides, various pitches containing mixtures of the above compounds as major components, condensed heterocyclic compounds including acenaphthylene, indole, isoindole, quinoline, isoquinoline, quinoxaline, phthalazine, carbazole, acridine, phenazine, phenanthridine, etc., and their derivatives.

The organic materials may further be furan resins including a homopolymer and a copolymer of furfuryl alcohol or furfural. Carbon materials produced by carbonizing those furan resins have a face interval of 0.370 nm or more for a (002) face and a true density of 1.7 g/cc or less, and do not have an oxidization heating peak at 700° C. or higher with differential thermal analysis (DTA), and hence exhibit highly excellent characteristics for use as negative electrode materials for secondary batteries.

These organic materials are fired at temperatures depending thereon, but are usually fired in a temperature range from 500 to 2000° C.

A material which is produced by introducing a functional group containing oxygen into a petroleum pitch having a certain H/C atomic ratio, a process known as so-called oxygen crosslinking, exhibits excellent characteristics when it is carbonized. Therefore, such a material can also be used as a carbon material for the negative electrodes 1.

The petroleum pitch may be produced from tar or asphalt which is obtained by thermally decomposing at high temperatures coal tar, ethylene bottom oil, crude oil, etc., according to distillation (vacuum distillation, normal-pressure distillation, or steam distillation), thermal polycondensation, extraction, chemical polycondensation, or the like.

The H/C atomic ratio of the petroleum pitch is important, and should be in the range from 0.6 to 0.8 in order to produce a hardly graphitizable carbon material.

The functional group containing oxygen may be introduced into the petroleum pitch by any of various processes. For example, a wet process using an aqueous solution of nitric acid, mixed acid, sulfuric acid, hypochlorous acid, or the like, or a dry process using an oxidizing gas such as air or oxygen, or a reaction using a solid reagent such as sulfur, ammonia nitrate, ammonia persulfate, ferric oxide, or the like.

For example, if oxygen is introduced into the petroleum pitch by any of the above processes, then a final carbonaceous material of a solid phase is obtained without being melted in the carbonizing process at a temperature of 400° C. or higher. Such a process is analogous to the process of producing a non-graphitizable carbon material.

The petroleum pitch into which the functional group containing oxygen has been introduced is carbonized into a negative electrode material. Conditions for carbonizing the petroleum pitch are not limited to specific details, but should be selected to produce a carbonaceous material which has a face interval of 0.370 nm or more for a (002) face and a true density of 1.7 g/cc or less, and does not have an oxidization heating peak at 700° C. or higher with DTA. The resultant carbon material contains a large amount of doped lithium per unit weight. For example, if a precursor containing a petroleum pitch which is oxygen-crosslinked contains at least 10% by weight of oxygen, then the face interval of its (002) face is 0.370 nm or greater. Therefore, the precursor should preferably contain at least 10% by weight of oxygen, and should contain oxygen in the range from 10 to 20% by weight for practical purposes.

If a carbonaceous material is formed from any of the above organic materials, then the organic material may be carbonized in a stream of nitrogen at a temperature ranging from 300 to 700° C., and then fired in a stream of nitrogen at a temperature that rises at a rate of 1 to 20° C. per minute up to 900 to 1300° C. and is kept in the range from 900 to 1300° C. for a period of time ranging from 0 to 5 hours. The carbonizing step may be dispensed with in some cases.

If any of the above furan resins or the petroleum pitch is carbonized, then a phosphorus or boron compound may be added to produce a special negative electrode compound which is doped with a large amount of lithium The phosphorus compound may be a phosphorus oxide such as phosphorus pentoxide or the like, an oxoacid such as orthophosphoric acid or its salt. For a better handling capability, a phosphorus oxide or phosphoric acid is preferable.

The amount of a phosphorus compound to be added is in the range from 0.2 to 30% by weight, preferably from 0.5 to 15% by weight, in terms of phosphorus with respect to the organic or carbonaceous material The proportion of phosphorus which remains in the negative electrode material is in the range from 0.2 to 9.0% by weight, preferably from 0.3 to 5% by weight.

The boron compound may be added in the form of an aqueous solution of a boron oxide or boric acid. The amount of a boron compound to be added is in the range from 0.2 to 30% by weight, preferably from 0.5 to 15% by weight, in terms of phosphorus with respect to the organic or carbonaceous material. The proportion of boron which remains in the negative electrode material is in the range from 0.2 to 9.0% by weight, preferably from 0.3 to 5% by weight.

Graphites have a higher true density than carbon materials processed at low temperatures, such as coke, glassy carbon, etc., and hence have a high electrode filling ability as an active material. Therefore, the use of graphites allows secondary batteries of high energy density to be manufactured.

Materials having a high true density for a high electrode filling ability are preferably carbon materials such as graphites. For a much higher electrode filling ability, the true density of such carbon materials should preferably be of 2.1 $g/cm^3$ or higher, more preferably be of 2.18 $g/cm^3$ or higher. To obtain such true density, it is necessary that the (002) face interval detected by X-ray diffraction be less than 0.339 nm, preferably at least 0.335 and less than 0.337 nm, and that the C-axis crystal thickness of the (002) face be at least 16.0 nm, preferably at least 300 nm.

One typical carbon material which exhibits the above properties is natural graphite Artificial graphite which is produced by carbonizing an organic material and processing it at a high temperature also exhibits the above crystal structure parameters.

An organic material used as a starting material to produce the above artificial graphite is typically coal or pitch.

The pitch may be produced from tar or asphalt which is obtained by thermally decomposing at high temperatures coal tar, ethylene bottom oil, crude oil, etc., according to distillation (vacuum distillation, normal-pressure distillation, or steam distillation), thermal polycondensation, extraction, chemical polycondensation, or the like, or may be produced when wood is processed by dry distillation.

The pitch may also comprise a polyvinyl chloride, polyvinyl acetate, polyvinyl butyrate, 3,5-dimethylphenol, or the like.

The coal or pitch is present in a liquid phase at about 400° C. at maximum while being carbonized, and is kept at that temperature, which causes aromatic rings to be condensed into a polycyclic structure in which they are stacked. Thereafter, when the coal or pitch is heated to a temperature of 500° C. or higher, it becomes a solid carbon precursor, i.e., semicoke. Such a process is referred to as a liquid-phase cabonization process which is typical for producing graphitizable carbon.

Alternatively, an organic material used as a starting material to produce the above artificial graphite may be any of condensed polycyclic hydrocarbon compounds including naphthalene, anthracene, triphenylene, pyrene, perylene, pentaphene, pentacene, etc., derivatives thereof, e.g., their carboxylic acids, carboxylic acid anhydrides, carboxylic acid imides, mixtures thereof, condensed heterocyclic compounds including acenaphthylene, indole, isoindole, quinoline, isoquinoline, quinoxaline, phthalazine, carbazole, acridine, phenazine, phenanthridine, etc., and their derivatives.

To produce the artificial graphite from any of the above organic materials, the organic material may be carbonized in a stream of an inert gas such as nitrogen at a temperature ranging from 300 to 700° C., and then calcinated in a stream of an inert gas at a temperature that rises at a rate of 1 to 100° C. per minute up to 900 to 1500° C. and is kept in the range from 900 to 1500° C. for a period of time ranging from 0 to 30 hours, and thereafter heated at 2000° C. or higher or preferably 2500° C. or higher. The carbonizing and calcinating steps may be dispensed with in some cases.

The carbon or graphite material which has been heated at the high temperature is then crushed and classified for use as a negative electrode material. The carbon or graphite material may be crushed before or after the carbonizing, calcinating, or heating step, or during the temperature raising step.

A graphite material which will exhibit practical performance should have the following properties:

Such a graphite material should have a true density of at least 2.1 g/cm$^3$ and a bulk specific gravity of at least 0.4 g/cm$^3$ If a negative electrode is made of such a graphite material with a high true density, then the electrode filling capability is high, resulting in an increased level of energy density of the secondary battery. If a graphitic material having a bulk specific gravity of at least 0.4 g/cm$^3$ is used, then the graphitic material is dispersed relatively uniformly in a depolarizing mix layer for the negative electrode. As a consequence, the negative electrode is well structured for improved cycle characteristics.

If a low-flatness graphite material having a bulk specific gravity of at least 0.41 g/cm$^3$ and an average shape parameter Xave of 125 or less is used, the negative electrode is better structured for further improved cycle characteristics.

To obtain such a graphite material, it is preferable to heat a molded body of carbon for graphitization. The heated molded body of carbon is then crushed into a graphite material which has a higher bulk specific density and a lower average shape parameter Xave.

If a graphite powder having an average shape parameter Xave in the above range and a specific surface area of 9 m$^2$/g or less is used as a graphite material, then only few submicron particles are attached to the graphite particles, and hence the graphite material has a high bulk specific gravity. As a result, the negative electrode is better structured for further improved cycle characteristics If a graphite powder having a cumulative 10% particle diameter of 3 μm or more, a cumulative 50% particle diameter of 10 μm or more, and a cumulative 90% particle diameter of 70 μm or more, a grain size distribution determined by X-ray diffraction is used as a graphite material for negative electrodes, then it is possible to manufacture a nonaqueous-electrolyte secondary battery which is highly safe and reliable. Specifically, the content of graphite particles having smaller grain sizes and hence providing a larger specific surface area is limited to prevent those graphite particles from developing abnormal heating as when the secondary battery is excessively charged. The content of graphite particles having larger grain sizes is also limited to prevent them from causing internal short-circuiting when they are expanded at the time the secondary battery is excessively charged. Therefore, it is possible to manufacture a practical nonaqueous-electrolyte secondary battery which is highly safe and reliable.

If a graphite powder whose particles have an average fracture strength of at least 6.0 kgf/mm$^2$ is used as a graphite material for the negative electrode, then since the negative electrode has many pores for containing an electrolyte, the resultant nonaqueous-electrolyte secondary battery has good load characteristics.

The positive electrodes 2 used in combination with the negative electrodes 1 may be made of any of various materials. Preferably, the positive electrodes 2 should be made of a material containing a sufficient amount of lithium (Li). For example, such a material may be a compound metal oxide comprising lithium and a transition metal, which is expressed by a general formula of LiMO$_2$ where M represents at least one of Co, Ni, Mn, Fe, Al, V, and Ti, or an interlaminar compound containing Li.

The nonaqueous-electrolyte secondary battery according to the present invention also has a nonaqueous electrolyte contained in the battery case 12 (see FIG. 1). The nonaqueous electrolyte comprises an electrolyte dissolved in a nonaqueous solvent The nonaqueous solvent is mainly composed of a solvent having a relatively high dielectric constant, such as ethylene carbonate (EC). In order to perfect the nonaqueous-electrolyte secondary battery according to the present invention, it is necessary to add a plurality of low-viscosity solvents to such a main solvent having a relatively high dielectric constant.

The main solvent having a relatively high dielectric constant may be propylene carbonate (PC), butylene carbonate, vinylene carbonate, sulfolanes, butyrolactones, valerolactones, or the like. The low-viscosity solvents may be a symmetric or asymmetric chain-like carbonic acid ester such as diethyl carbonate (DEC), dimethyl carbonate (DMC), methyl ethyl carbonate (MEC), methyl propyl carbonate (MPC), or the like. Two or more low-viscosity solvents may be mixed with each other.

If the negative electrodes 1 are made of a graphite material, then the main nonaqueous solvent may typically be ethylene carbonate, but may also be a compound where hydrogen atoms of ethylene carbonate are replaced with a halogen element.

Good characteristics can be achieved by substituting a second solvent for a portion of a compound which is reactive with a graphite material and in which hydrogen atoms of ethylene carbonate are replaced with a halogen element. The second solvent may be propylene carbonate, butylene carbonate, 1,2-dimethoxyethane, 1,2-diethoxymethane, γ-butyrolactone, valerolactone, tetrahydrofuran, 2-methyltetrahydrofuran, 1,3-dioxolane, 4-methyl-1,3-dioxolane, sulfolane, methylsulfolane, or the like. The second solvent should preferably be added in an amount of less than 10% by volume.

In order to perfect the nonaqueous-electrolyte secondary battery according to the present invention, a third solvent may be added to the main solvent or a mixture of the main solvent and the second solvent for increasing the electric conductivity, suppressing the decomposition of ethylene carbonate, improving low-temperature characteristics, lowering the reactivity with lithium for increased safety.

The third solvent is preferably a symmetric chain-like carbonic acid ester such as diethyl carbonate (DEC), dimethyl carbonate (DMC), or the like, or an asymmetric chain-like carbonic acid ester such as methyl ethyl carbonate (MEC), methyl propyl carbonate (MPC), or the like. The ratio of the main solvent or a mixture of the main solvent and the second solvent to the third solvent of chain-like carbonic acid ester (the main solvent or the mixture of the main solvent and the second solvent: the third solvent) should preferably be in the range from 15:85 to 40:60, and more preferably from 18:82 to 35:65.

The third solvent may comprise a mixture of methyl ethyl carbonate and dimethyl carbonate which are mixed at a ratio in a range represented by $1/9 \leq d/m \leq 8/2$ where m represents the volume of methyl ethyl carbonate and d represents the volume of dimethyl carbonate. The ratio at which the main solvent or the mixture of the main solvent and the second solvent is mixed with the third solvent which comprises the mixture of methyl ethyl carbonate and dimethyl carbonate should preferably be in a range represented by $3/10 \leq (m+d)/T \leq 9/10$ and more preferably $5/10 \leq (m+d)/T \leq 8/10$ where m represents the volume of methyl ethyl carbonate, d represents the volume of dimethyl carbonate, and T represents the total volume of the solvents that are used.

The electrolyte dissolved in the nonaqueous solvent may comprise one or more of electrolytes that are used in nonaqueous-electrolyte secondary batteries For example, the electrolyte is preferably $LiPF_6$. Other electrolytes including $LiClO_4$, $LiAsF_6$, $LiBF_4$, $LiB(C_6H_5)_4$, $CH_3SO_3Li$, $CF_3SO_3Li$, $LiN(CF_3SO_2)_2$, $LiC(CF_3SO_2)_3$, LiCl, LiBr, etc. can also be used.

Examples of the nonaqueous-electrolyte secondary battery according to the first embodiment of the present invention will be described below Inventive Example 1

The negative electrodes 1 were manufactured as follows:

A petroleum pitch whose H/C atomic ratio was selected from the range from 0.6 to 08 was crushed and oxidized in a stream of air, producing a carbon precursor. The carbon precursor contained 80% of insoluble quinoline as determined by a centrifugal process K2425-1983 according to JIS, where JIS refers to Japanese Information Standard, and 15.4% by weight as determined by an organic element analyzing process.

The carbon precursor was heated up to 1000° C. in a stream of nitrogen, and then crushed into a carbon material powder having an average particle diameter of 10 μm. The carbon material powder, obtained as a hardly graphitizable carbon material, was measured by X-ray diffraction. As a result, the face interval for a (002) face was 0.381 nm and the true density was 1.54 g/cc.

90 parts by weight of the carbon material powder was mixed with 10 parts by weight of a binder of polyvinylidene fluoride, preparing a negative electrode mixture. The negative electrode mixture was then dispersed into a solvent of N-methyl-2-pyrrolidone, producing a negative electrode slurry.

The negative electrode slurry was then coated uniformly on both surfaces of a web-shaped copper foil having a thickness of 10 μm which would serve as a negative electrode collector. After the coated web-shaped copper foil was dried, it was pressed into a web-shaped negative electrode by a roll press. The web-shaped negative electrode was then cut into a rectangular shape, producing a negative electrode 1, as shown in FIG. 5A.

The positive electrodes 2 were manufactured as follows:

Lithium carbonate and cobalt carbonate were mixed at a ratio of 0.5 mol: 1.0 mol, and the mixture was fired in air at 900° C. for 5 hours, producing $LiCoO_2$.

91 parts by weight of the $LiCoO_2$ thus produced were mixed with 6 parts by weight of an electric conductor of graphite and 3 parts by weight of a binder of polyvinylidene fluoride, preparing a positive electrode mixture. The positive electrode mixture was then dispersed into a solvent of N-methyl-2-pyrrolidone, producing a positive electrode slurry.

The positive electrode slurry was then coated uniformly on both surfaces of a web-shaped aluminum foil having a thickness of 20 μm which would serve as a positive electrode collector. After the coated web-shaped aluminum foil was dried, it was pressed into a web-shaped positive electrode by a roll press. The web-shaped positive electrode was then cut into a rectangular shape, producing a positive electrode 2, as indicated by the dotted lines in FIG. 5B.

Figures 6A, 6B:
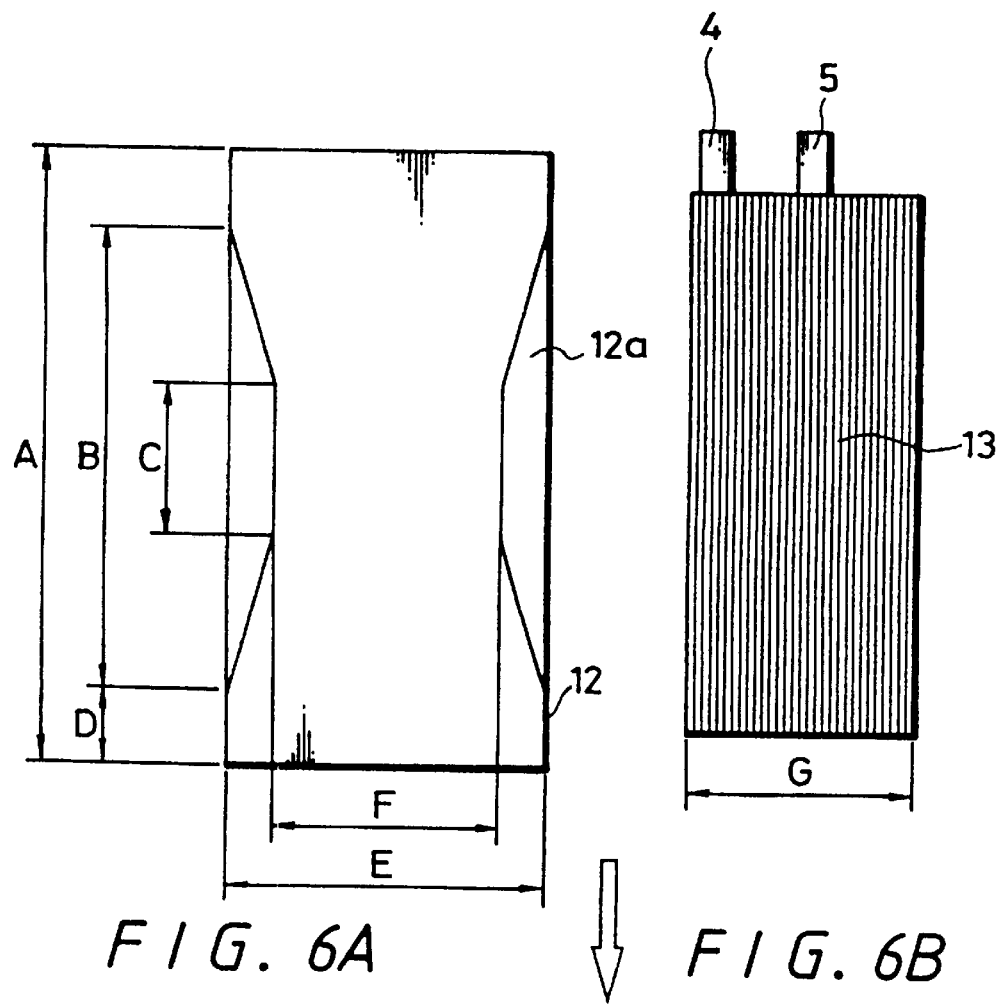
FIGS. 6A, 6B, and 6C are cross-sectional views illustrative of the manner in which the nonaqueous-electrolyte secondary battery shown in FIG. 1 is assembled.
Figure 6C:
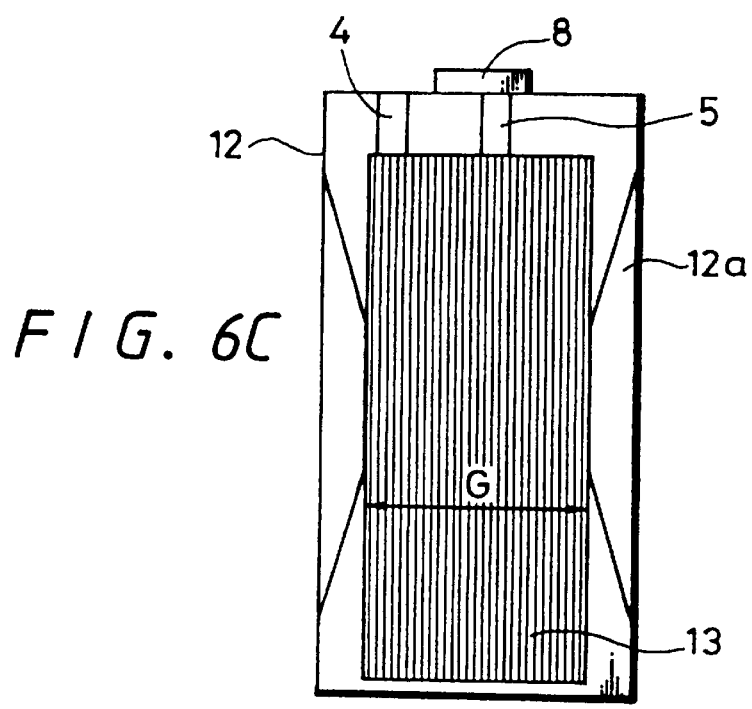

Negative electrodes 1 and positive electrodes 2 thus fabricated were sandwiched by separators 3 each comprising a microporous polypropylene film, and fastened together by an adhesive tape 10, thereby producing a laminated electrode assembly Then as shown in FIG. 1, an insulating sheet 11 was placed on an inner surface of the bottom wall of a battery case 12 of iron in the form of a hollow flat rectangular parallelepiped, the battery case 12 being plated with a nickel layer having a thickness of 450 μm, and the laminated electrode assembly was introduced into the battery case 12 through its open end 14 placed on the insulating sheet 11 (see also FIGS. 6A through 6C). The width of the battery case 12, which represents the dimension between respective outer surfaces of those side walls of the battery case 1 which are free of the lands 12a, was 34 mm. The dimensions A, B, C, D, E, F of the battery case 12 shown in FIGS. 2A and 6A were A=48 mm, B=40 mm, C=15 mm, D=4 mm, E=8.3 mm, and F=6.6 mm. The laminated electrode assembly had a thickness G (see FIG. 6B) of 6.6 mm.

Thereafter, an auxiliary lead 6 was welded to a positive electrode terminal 8 which had been mounted on a battery lid 9 through a gasket 7. Positive electrode leads 5 connected to the respective positive electrodes 2 are welded to the auxiliary lead 6. Negative electrode leads 4 connected to the respective negative electrodes 1 are welded to the battery lid 9.

An electrolyte of $LiPF_6$ was dissolved at a ratio of 1 mol/l into a mixture of 50% by volume of a solvent of propylene carbonate and 50% by volume of a solvent of dimethyl carbonate, preparing a nonaqueous electrolyte. The nonaqueous electrolyte was poured into the battery case 12, and then the battery lid 9 was affixed to the battery case 12 by laser beam welding, thereby completing a lithium ion secondary battery in the shape of a flat rectangular parallelepiped.

Inventive Example 2

A graphite material powder produced from a molded body of carbon for graphitization for use as a negative electrode material was manufactured as follows:

30 parts by weight of a binder of coal tar pitch was added to 100 parts by weight of a filler of coal coke, and they were mixed together at about 100° C. Thereafter, the mixture was pressed by a press, producing a precursor for a molded body of carbon. The precursor was then heated at a temperature of 1000° C. or lower, thereby producing a molded body of carbon. The molded body of carbon was impregnated with a binder pitch that had been melted at a temperature of 200° C. or lower, and then fired at a temperature of 1000° C. or lower. Such an impregnating and firing process was repeated several times. Thereafter, the molded body of carbon was heated at 2600° C. in an inert atmosphere, producing a graphitized molded body, which was crushed and classified into a graphite material powder.

The produced graphite material powder had a true density of 2.23 g/cm$^3$, a bulk specific gravity of 0.83 g/cm$^3$, an average shape parameter Xave of 10, a specific surface area of 4.4 m$^2$/g, an average particle diameter of 31.2 $\mu$m, a cumulative 10% particle diameter of 12.3 $\mu$m, a cumulative 50% particle diameter of 29.5 $\mu$m, and a cumulative 90% particle diameter of 53.7 $\mu$m.

Except that the graphite material powder was used as a negative electrode material, a lithium ion secondary battery in the shape of a flat rectangular parallelepiped was produced in the same manner as with Inventive Example 1.

Inventive Example 3

A lithium ion secondary battery in the shape of a flat rectangular parallelepiped was produced in the same manner as with Inventive Example 2, except that the battery case 12 in the form of a hollow flat rectangular parallelepiped had a width of 34 mm and dimensions A=48 mm, B=40 mm, C=15 mm, D=4 mm, E=8.3 mm, and F=72 mm.

Inventive Example 4

A lithium ion secondary battery in the shape of a flat rectangular parallelepiped was produced in the same manner as with Inventive Example 2, except that the battery case 12 in the form of a hollow flat rectangular parallelepiped had a width of 34 mm and dimensions A=48 mm, B=40 mm, C=15 mm, D=4 mm, E=8.3 mm, and F=7.8 mm.

Inventive Example 5

A lithium ion secondary battery in the shape of a flat rectangular parallelepiped was produced in the same manner as with Inventive Example 2, except that the battery case 12 in the form of a hollow flat rectangular parallelepiped had a width of 34 mm and dimensions A=48 mm, B=30 mm, C=10 mm, D=9 mm, E=8.3 mm, and F=7.2 mm.

Inventive Example 6

A lithium ion secondary battery in the shape of a flat rectangular parallelepiped was produced in the same manner as with Inventive Example 2, except that the battery case 12 in the form of a hollow flat rectangular parallelepiped had a width of 34 mm and dimensions A=48 mm, B=12 mm, C=6 mm, E=8.3 mm, F=6.8 mm, and D1=9 mm and D2=25 mm for two lands 12a on each side wall. The two lands on each side wall were juxtaposed along the dimension A, i.e., the length between the outer surface of the lid 9 and the outer surface of the bottom wall of the battery case 12. The dimensions D1, D2 represent respective distances between the outer surface of the bottom wall of the battery case 12 and the respective outer circumferential edges of the lands 12a which are closest to the outer surface of the bottom wall.

Inventive Example 7

A lithium ion secondary battery in the shape of a flat rectangular parallelepiped was produced in the same manner as with Inventive Example 2, except that the electrode assembly had a dimension G=6.8.

Comparative Example 1

A lithium ion secondary battery in the shape of a flat rectangular parallelepiped was produced in the same manner as with Inventive Example 1, except that a battery case in the form of a hollow flat rectangular parallelepiped free of any lands was used.

Comparative Example 2

A lithium ion secondary battery in the shape of a flat rectangular parallelepiped was produced in the same manner as with Inventive Example 2, except that a battery case in the form of a hollow flat rectangular parallelepiped free of any lands was used.

Comparative Example 3

A lithium ion secondary battery in the shape of a flat rectangular parallelepiped was produced in the same manner as with Inventive Example 2, except that the battery case 12 in the form of a hollow flat rectangular parallelepiped had a width of 34 mm and dimensions A=48 mm, B=30 mm, C=10 mm, D=9 mm, E=8.3 mm, and F=8.1 mm.

The lithium ion secondary batteries according to Inventive Examples 1–7 and Comparative Examples 1–3 were charged with a constant current of 400 mA at a constant voltage of 4.2 V for 5 hours, thereafter discharged with a constant current of 400 mA down to a voltage of 2.75 V, and then measured for an initial battery capacity, a Coulomb efficiency, and a battery case thickness. The lithium ion secondary batteries were also measured for a battery case thickness after they were charged at 4.2 V and then kept at 90° C. The Coulomb efficiency represented the ratio of a discharged capacity to a charged capacity of the batteries, and the battery case width represented the dimension F (see FIGS. 2A and 6A). The measured data are shown in Table 1 below.

TABLE 1

|        | I   | II   | III | IV   | V   |
|--------|-----|------|-----|------|-----|
| In. Ex. 1 | 802 | 75.3 | 8.2 | 0.86 | 8.5 |
| In. Ex. 2 | 996 | 87.6 | 8.3 | 0.86 | 8.6 |
| In. Ex. 3 | 992 | 87.0 | 8.3 | 0.95 | 8.6 |
| In. Ex. 4 | 989 | 86.5 | 8.4 | 1.05 | 8.8 |
| In. Ex. 5 | 994 | 87.2 | 8.3 | 0.95 | 8.5 |
| In. Ex. 6 | 989 | 86.5 | 8.3 | 0.89 | 8.7 |

TABLE 1-continued

|  | I | II | III | IV | V |
|---|---|---|---|---|---|
| In. Ex. 7 | 1005 | 87.4 | 8.4 | 0.84 | 8.8 |
| Co. Ex. 1 | 763 | 73.6 | 8.5 | 1.12 | 9.0 |
| Co. Ex. 2 | 966 | 85.1 | 8.9 | 1.12 | 9.4 |
| Co. Ex. 3 | 972 | 86.0 | 8.7 | 1.09 | 9.2 |

I: Initial capacity (mAh)
II: Initial Coulomb efficiency (%)
III: Battery case thickness after being initially charged (mm)
IV: Inside case width/electrode assembly width
V: Battery case thickness after being kept at 90° C. for one day (mm)

It has been found out that the nonaqueous-electrolyte secondary battery according to the present invention has a high initial battery capacity and a high Coulomb efficiency, suffers a small increase in the battery case thickness after being kept at 90° C., and hence is highly reliable after being kept at high temperatures.

More specifically, the secondary batteries with no lands on the battery cases (Comparative Examples 1 and 2) had respective battery case thicknesses of 8.5 mm and 8.9 mm after being initially charged, whereas the secondary batteries with lands on the battery cases (Inventive Examples 1–7) had respective battery case thicknesses in the range from 8.2 mm to 8.4 mm, indicating that their battery thicknesses remain substantially unchanged.

It has been confirmed, therefore, that the secondary batteries with lands on the battery cases suffer a smaller increase in the battery case thickness than the secondary batteries with no lands on the battery cases.

The secondary batteries with no lands on the battery cases (Comparative Examples 1 and 2) had respective battery case thicknesses of 9.0 mm and 9.4 mm after being kept at 90° C. for one day, whereas the secondary batteries with lands on the battery cases (Inventive Examples 1–7) had respective battery case thicknesses in the range from 8.5 mm to 8.8 mm after being kept at 90° C. for one day, indicating that their battery case thicknesses suffer a small change.

This has also confirmed that the secondary batteries with lands on the battery cases suffer a smaller increase in the battery case thickness than the secondary batteries with no lands on the battery cases.

Figure 7:
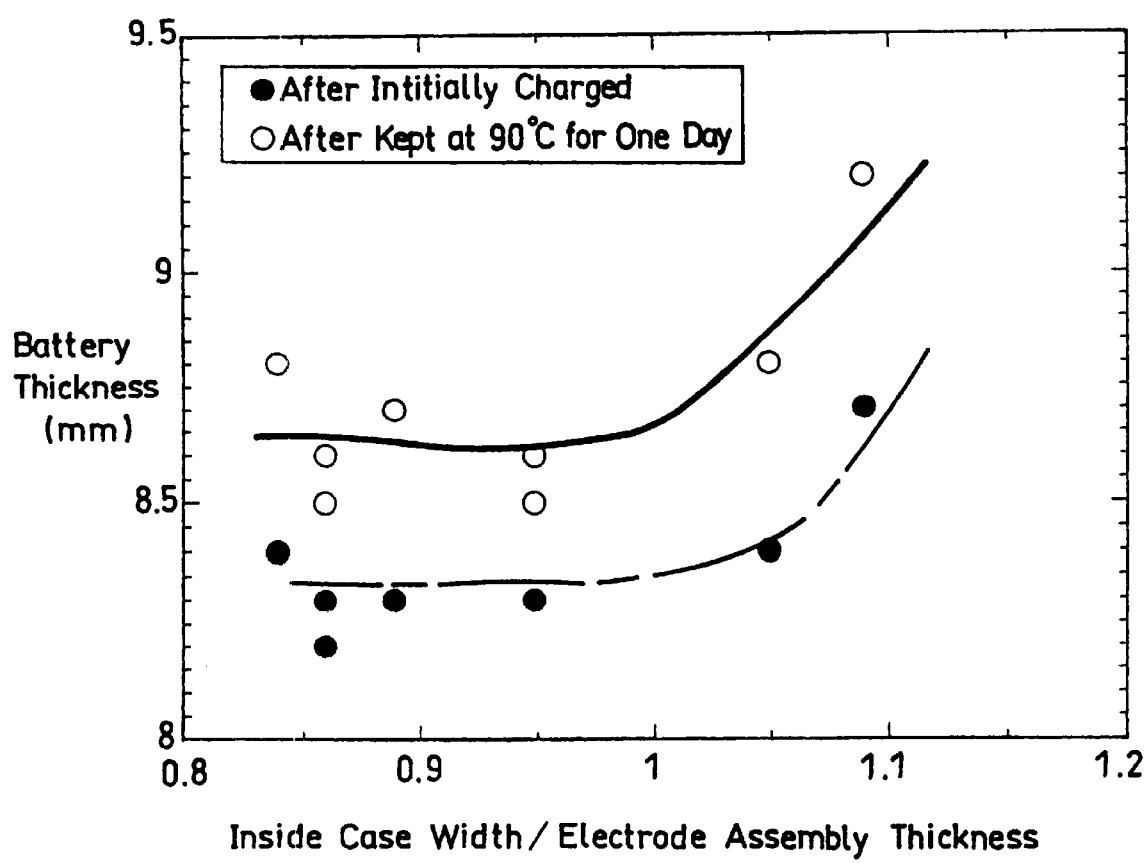
FIG. 7 is a diagram showing the relationship between the battery thickness and the ratio of the inside case width to the electrode assembly thickness.

FIG. 7 shows the relationship between the battery case thickness and the ratio of the inside case width to the electrode assembly thickness with respect to the battery cases with lands thereon (Inventive Examples 1–7, Comparative Example 3). The inside case width represents a value produced by subtracting the wall thickness (0.45 mm+0.45 mm=0.9 mm) of the battery case from the dimension F (battery case thickness), before the electrode assembly is introduced into the battery case.

When the ratio of the inside case width to the electrode assembly thickness is in the range from 0.84 to 1.05 (Inventive Examples 1–7), the battery case thickness after being initially charged is in a relatively small range from 8.2 to 8.4 mm. When the ratio of the inside case width to the electrode assembly thickness is of 1.09 (Comparative Example 3), the battery case thickness after being initially charged is of a much higher value of 8.7 mm.

It can be understood, therefore, that even a battery case with lands thereon suffers a large increase in the battery case thickness after being initially charged if the ratio of the inside case width to the electrode assembly thickness is of 1.09.

When the ratio of the inside case width to the electrode assembly thickness is in the range from 0.84 to 1.05 (Inventive Examples 1–7), the battery case thickness after being kept at 90° C. for one day is in a relatively small range from 8.5 to 8.8 mm. When the ratio of the inside case width to the electrode assembly thickness is of 1.09 (Comparative Example 3), the battery case thickness after being kept at 90° C. for one day is of a much higher value of 9.2 mm.

It can be seen, therefore, that even a battery case with lands thereon suffers a large increase in the battery case thickness after being kept at 90° C. for one day if the ratio of the inside case width to the electrode assembly thickness is of 1.09.

Consequently, the inside case width along a direction across the lands 12a prior to the introduction of the electrode assembly into the battery case 12 is preferably less than 1.09 times the thickness of the electrode assembly, and more preferably at most 1.05 times the thickness of the electrode assembly The ratio of the inside case width to the electrode assembly thickness is preferably at least 0.3, and more preferably at least 0.5.

If the ratio of the inside case width to the electrode assembly thickness were less than 0.3, then the electrode assembly would possibly be broken when it is placed into the battery case, and the capacity of the electrode assembly that can be housed in the battery case would be so small that the energy density, ice., the energy per unit volume, of the battery would be undesirably small.

FIGS. 8 and 9A through 9C show a nonaqueous-electrolyte secondary battery according to a second embodiment of the present invention.

The nonaqueous-electrolyte secondary battery shown in FIGS. 8 and 9A through 9C is similar to the nonaqueous-electrolyte secondary battery according to the first embodiment shown in FIGS. 1 and 2A and 2B, except that a battery case in the form of a hollow flat rectangular parallelepiped has no lands on its side walls, but has round corners R1, R2, R3, R4, R5, R6, R7, R8 (see FIGS. 9A through 9B) each joining adjacent walls of the battery case. Specifically, as shown in FIG. 9A, two adjacent side walls of the battery case 12 are joined to each other by an outwardly convex round corner R1, R2, R3, or R4. As shown in FIGS. 9B and 9C, a bottom wall of the battery case 12 is joined to an adjacent side wall by an outwardly convex round corner R5, R6, R7, R8.

The radius of curvature of each of the round corners R1, R2, R3, R4, R5, R6, R7, R8 should be selected in view of the fact that if the radius of curvature were too large, an effective volume for housing the electrode assembly would be so small that the energy density of the secondary battery would be unduly small.

Since all the corners of the battery case 12 except its open end 14 are round, as described above, an internal pressure buildup developed upon exposure to high-temperature environments is prevented from concentrating on local areas of the battery case 12. As a result, the battery case 12 is prevented from unduly increasing its thickness under an internal pressure buildup. The nonaqueous-electrolyte secondary battery does not damage or break a portable electronic device which employs the nonaqueous-electrolyte secondary battery, is highly reliable, and has a high level of energy density.

The negative electrodes 1, the positive electrodes 2, the battery case 12, etc. of the nonaqueous-electrolyte secondary battery according to the second embodiment are made of the same materials as those described above in detail with respect to the nonaqueous-electrolyte secondary battery according to the first embodiment.

Examples of the nonaqueous-electrolyte secondary battery according to the second embodiment of the present invention will be described below.

Inventive Example 8

The negative electrodes 1 were manufactured as follows:

A petroleum pitch whose H/C atomic ratio was selected from the range from 0.6 to 0.8 was crushed and oxidized in a stream of air, producing a carbon precursor. The carbon precursor contained 80% of insoluble quinoline as determined by a centrifugal process K2425-1983 according to JIS, and 15.4% by weight as determined by an organic element analyzing process.

The carbon precursor was heated up to 1000° C. in a stream of nitrogen, and then crushed into a carbon material powder having an average particle diameter of 10 $\mu$m. The carbon material powder, obtained as a hardly graphitizable carbon material, was measured by X-ray diffraction. As a result, the face interval for a (002) face was 0.381 nm and the true density was 1.54 g/cc.

90 parts by weight of the carbon material powder was mixed with 10 parts by weight of a binder of polyvinylidene fluoride, preparing a negative electrode mixture. The negative electrode mixture was then dispersed into a solvent of N-methyl-2-pyrrolidone, producing a negative electrode slurry.

The negative electrode slurry was then coated uniformly on both surfaces of a web-shaped copper foil having a thickness of 10 $\mu$m which would serve as a negative electrode collector. After the coated web-shaped copper foil was dried, it was pressed into a web-shaped negative electrode by a roll press The web-shaped negative electrode was then cut into a rectangular shape, producing a negative electrode 1, as shown in FIG. 5A.

The positive electrodes 2 were manufactured as follows:

Lithium carbonate and cobalt carbonate were mixed at a ratio of 0.5 mol: 1.0 mol, and the mixture was fired in air at 900° C. for 5 hours, producing $LiCoO_2$.

91 parts by weight of the $LiCoO_2$ thus produced were mixed with 6 parts by weight of an electric conductor of graphite and 3 parts by weight of a binder of polyvinylidene fluoride, preparing a positive electrode mixture. The positive electrode mixture was then dispersed into a solvent of N-methyl-2-pyrrolidone, producing a positive electrode slurry.

The positive electrode slurry was then coated uniformly on both surfaces of a web-shaped aluminum foil having a thickness of 20 $\mu$m which would serve as a positive electrode collector. After the coated web-shaped aluminum foil was dried, it was pressed into a web-shaped positive electrode by a roll press. The web-shaped positive electrode was then cut into a rectangular shape, producing a positive electrode 2, as indicated by the dotted lines in FIG. 5B.

Negative electrodes 1 and positive electrodes 2 thus fabricated were sandwiched by separators 3 each comprising a microporous polypropylene film, and fastened together by an adhesive tape 10, thereby producing a laminated electrode assembly.

Figure 8:
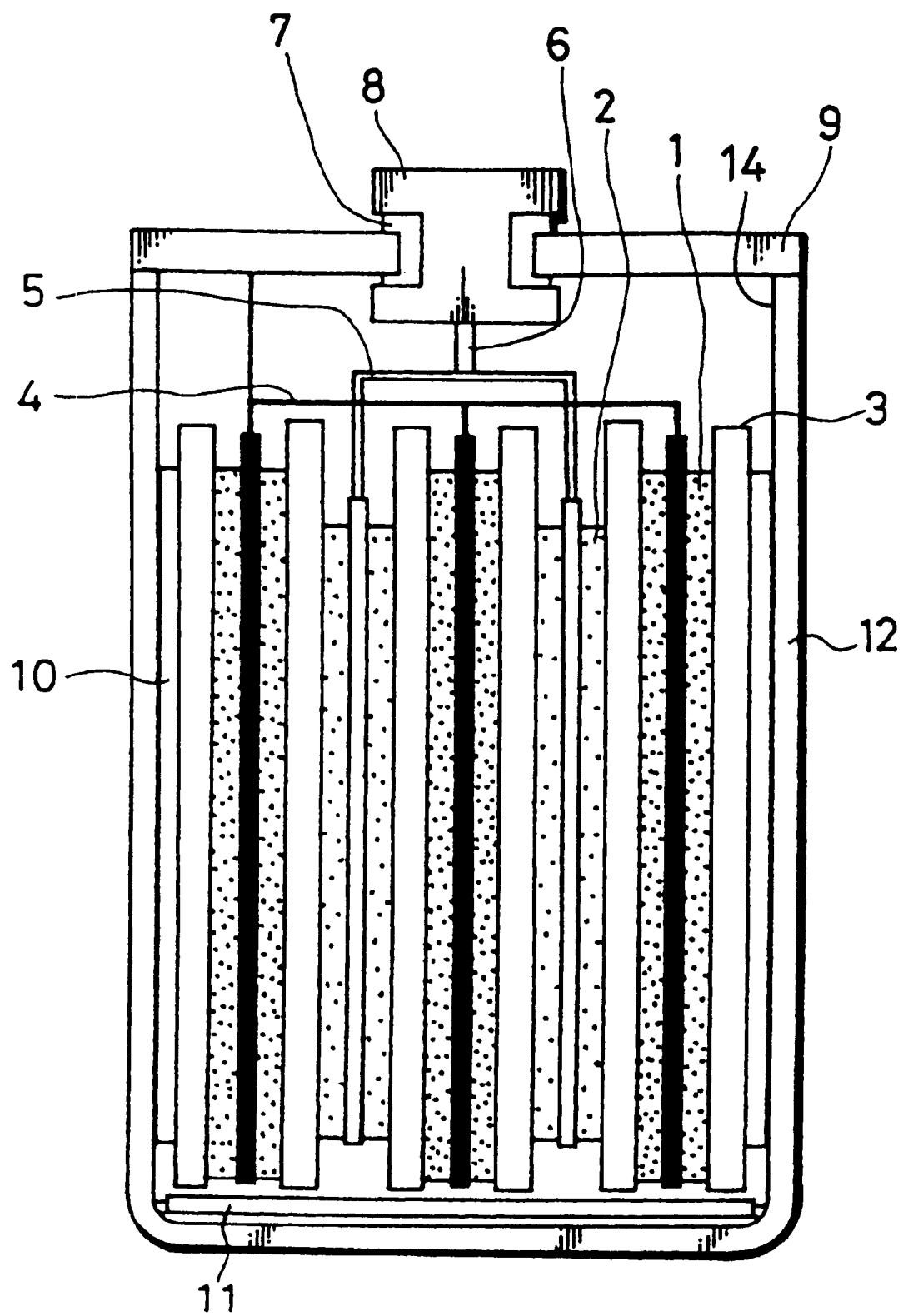
FIG. 8 is a cross-sectional view of a nonaqueous-electrolyte secondary battery according to a second embodiment of the present invention.

Then, as shown in FIG. 8, an insulating sheet 11 was placed on an inner surface of the bottom wall of a battery case 12 of iron in the form of a hollow flat rectangular parallelepiped, the battery case 12 being plated with a nickel layer having a thickness of 450 $\mu$m, and the laminated electrode assembly was introduced into the battery case 12 through its open end 14 placed on the insulating sheet 11.

The round corners R1–R8 had respective radii of curvature of R1=7.5 mm, R2=7.5 mm, R3=7.5 mm, R4=7.5 mm, R5=3 mm, R6=3 mm, R7=3 mm, and R8=3 mm.

Thereafter an auxiliary lead 6 was welded to a positive electrode terminal 8 which had been mounted on a battery lid 9 through a gasket 7. Positive electrode leads 5 connected to the respective positive electrodes 2 are welded to the auxiliary lead 6. Negative electrode leads 4 connected to the respective negative electrodes 1 are welded to the battery lid 9.

An electrolyte of $LiPF_6$ was dissolved at a ratio of 1 mol/l into a mixture of 50% by volume of a solvent of propylene carbonate and 50% by volume of a solvent of dimethyl carbonate, preparing a nonaqueous electrolyte. The nonaqueous electrolyte was poured into the battery case 12, and then the battery lid 9 was affixed to the battery case 12 by laser beam welding, thereby completing a lithium ion secondary battery in the shape of a flat rectangular parallelepiped.

Inventive Example 9

A graphite material powder produced from a molded body of carbon for graphitization for use as a negative electrode material was manufactured as follows:

30 parts by weight of a binder of coal tar pitch was added to 100 parts by weight of a filler of coal coke, and they were mixed together at about 100° C. Thereafter, the mixture was pressed by a press, producing a precursor for a molded body of carbon. The precursor was then heated at a temperature of 1000° C. or lower, thereby producing a molded body of carbon. The molded body of carbon was impregnated with a binder pitch that had been melted at a temperature of 200° C. or lower, and then fired at a temperature of 1000° C. or lower. Such an impregnating and firing process was repeated several times. Thereafter, the molded body of carbon was heated at 2600° C. in an inert atmosphere, producing a graphitized molded body, which was crushed and classified into a graphite material powder.

The produced graphite material powder had a true density of 2.23 g/cm$^3$, a bulk specific gravity of 0.83 g/cm$^3$, an average shape parameter Xave of 10, a specific surface area of 4.4 m$^2$/g, an average particle diameter of 31.2 $\mu$m, a cumulative 10% particle diameter of 12.3 $\mu$m, a cumulative 50% particle diameter of 29.5 $\mu$m, and a cumulative 90% particle diameter of 53.7 $\mu$m.

Except that the graphite material powder was used as a negative electrode material and that an electrolyte of $LiPF_6$ was dissolved at a ratio of 1 mol/l into a mixture of 50% by volume of a solvent of ethylene carbonate and 50% by volume of a solvent of diethyl carbonate, preparing a nonaqueous electrolyte, a lithium ion secondary battery in the shape of a flat rectangular parallelepiped was produced in the same manner as with Inventive Example 8.

Comparative Example 4

A lithium ion secondary battery in the shape of a flat rectangular parallelepiped was produced in the same manner as with Inventive Example 8, except that a battery case in the form of a hollow flat rectangular parallelepiped free of any round corners was used, i.e., the radii of curvature of the corners were R1=0.6 mm, R2=0.6 mm, R3=0.6 mm, R4=0.6 mm, R5=1 mm, R6=1 mm, R7=1 mm, and R8=1 mm.

Comparative Example 5

A lithium ion secondary battery in the shape of a flat rectangular parallelepiped was produced in the same manner as with Inventive Example 9, except that a battery case in the form of a hollow flat rectangular parallelepiped free of any round corners was used, i.e., the radii of curvature of the corners were R1=0.6 mm, R2=0.6 mm, R3=0.6 mm, R4=0.6 mm, R5=1 mm, R6=1 mm, R7=1 mm, and R8=1 mm.

Comparative Example 6

A lithium ion secondary battery in the shape of a flat rectangular parallelepiped was produced in the same manner as with Inventive Example 8, except that a battery case in the form of a hollow flat rectangular parallelepiped free of some round corners was used, i.e., the radii of curvature of the corners were R1=7.5 mm, R2=7.5 mm, R3=7.5 mm, R4=7.5 mm, R5=1 mm, R6=1 mm, R7=1 mm, and R8=1 mm.

Comparative Example 7

A lithium ion secondary battery in the shape of a flat rectangular parallelepiped was produced in the same manner as with Inventive Example 9, except that a battery case in the form of a hollow flat rectangular parallelepiped free of some round corners was used, i.e., the radii of curvature of the corners were R1=7.5 mm, R2=7.5 mm, R3=7.5 mm, R4=7.5 mm, R5=1 mm, R6=1 mm, R7=1 mm, and R8=1 mm.

The lithium ion secondary batteries according to Inventive Examples 8, 9 and Comparative Examples 4–7 were charged with a constant current of 400 mA at a constant voltage of 4.2 V for 5 hours, thereafter kept at 90° C., and then measured for a battery case thickness. The measured data are shown in Table 2 below.

TABLE 2

|  | Battery case thickness after being charged at 4.2 V (mm) | Increase in battery case thickness after being kept at 90° C. for one day (mm) |
| --- | --- | --- |
| In. Ex. 8 | 7.65 | 0.31 |
| In. Ex. 9 | 8.13 | 0.33 |
| Co. Ex. 4 | 7.65 | 0.63 |
| Co. Ex. 5 | 8.13 | 0.55 |
| Co. Ex. 6 | 7.64 | 0.50 |
| Co. Ex. 7 | 8.13 | 0.45 |

The battery thickness after being charged at 4.2 V, referred to in Table 2 above, is the measured thickness of the battery after it was charged with a constant current of 400 mA at a constant voltage of 4.2 V for 5 hours. The increase in the battery case thickness after being kept at 90° C. for one day, referred to in Table 2 above, is the measured difference between the thickness of the charged battery after being kept at 90° C. for one day and the battery thickness after being charged at 4.2 V.

As can be seen from Table 2, the batteries according to Comparative Examples 4 through 7 had relatively large values ranging from 0.45 mm to 0.63 mm with respect to the increase in the battery case thickness after being kept at 90° C. for one day, whereas the batteries according to Inventive Examples 8 and 9 had relatively small values of 0.31 mm and 0.33 mm with respect to the increase in the battery case thickness after being kept at 90° C. for one day. This appears to result from the fact that since the battery cases of Inventive Examples 8 and 9 have more round corners of large radii of curvatures than the battery cases of Comparative Examples 4 through 7, those round corners of large radii of curvatures are effective to prevent the battery cases of Inventive Examples 8 and 9 from being unduly deformed.

It can be understood, therefore, that even when the nonaqueous-electrolyte secondary battery according to the second embodiment of the present invention is kept at 90° C., the thickness of the battery case suffers only a small increase, and hence the nonaqueous-electrolyte secondary battery is highly reliable when kept at high temperatures.

Figure 10:
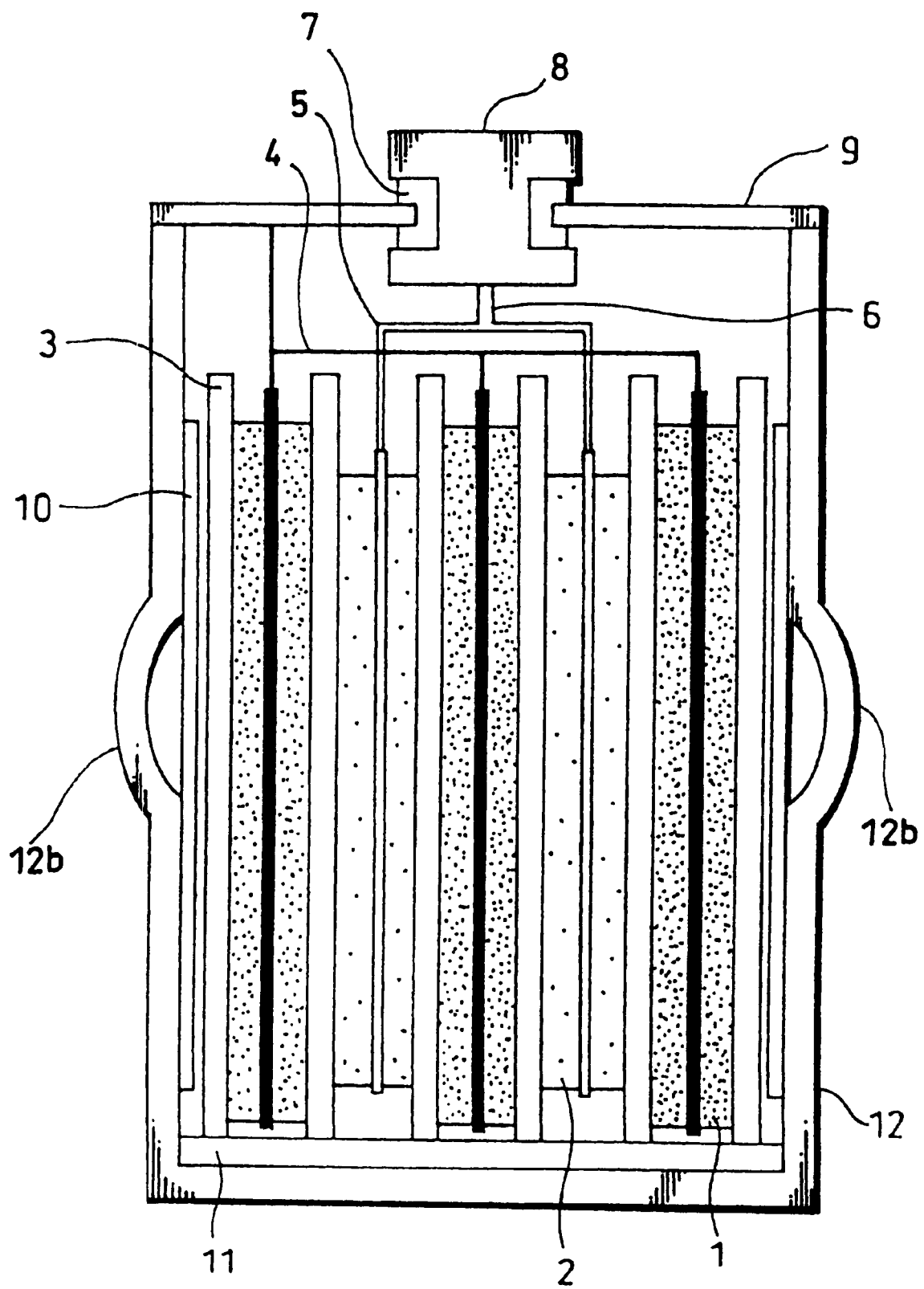
FIG. 10 is a cross-sectional view of a nonaqueous-electrolyte secondary battery according to a third embodiment of the present invention.

FIG. 10 shows a nonaqueous-electrolyte secondary battery according to a third embodiment of the present invention.

The nonaqueous-electrolyte secondary battery shown in FIG. 10 is similar to the nonaqueous-electrolyte secondary battery according to the first embodiment shown in FIGS. 1 and 2A and 2B, except that a battery case in the form of a hollow flat rectangular parallelepiped has a pair of opposite side walls, i.e., wider side walls, dented outwardly to provide outwardly projecting lands 12b on the respective wider side walls thereof. The outwardly projecting lands 12b, which have outwardly convex round surfaces, are effective in stiffening the wider side walls against an internal pressure buildup developed when the battery is exposed to high-temperature environments. As a consequence, the battery case 12 is prevented from unduly increasing its thickness under an internal pressure buildup Therefore, the nonaqueous-electrolyte secondary battery does not damage or break a portable electronic device which employs the nonaqueous-electrolyte secondary battery, is highly reliable, and has a high level of energy density.

The negative electrodes 1, the positive electrodes 2, the battery case 12, etc. of the nonaqueous-electrolyte secondary battery according to the third embodiment are made of the same materials as those described above in detail with respect to the nonaqueous-electrolyte secondary battery according to the first embodiment.

Examples of the nonaqueous-electrolyte secondary battery according to the third embodiment of the present invention will be described below.

Inventive Example 10

The negative electrodes 1 were manufactured as follows:

A petroleum pitch whose H/C atomic ratio was selected from the range from 0.6 to 0.8 was crushed and oxidized in a stream of air, producing a carbon precursor. The carbon precursor contained 80% of insoluble quinoline as determined by a centrifugal process K2425-1983 according to JIS, and 15.4% by weight as determined by an organic element analyzing process.

The carbon precursor was heated up to 1000° C. in a stream of nitrogen, and then crushed into a carbon material powder having an average particle diameter of 10 $\mu$m. The carbon material powder, obtained as a hardly graphitizable carbon material, was measured by X-ray diffraction. As a result, the face interval for a (002) face was 0.381 nm and the true density was 1.54 g/cc.

90 parts by weight of the carbon material powder was mixed with 10 parts by weight of a binder of polyvinylidene fluoride, preparing a negative electrode mixture. The negative electrode mixture was then dispersed into a solvent of N-methyl-2-pyrrolidone, producing a negative electrode slurry.

The negative electrode slurry was then coated uniformly on both surfaces of a web-shaped copper foil having a thickness of 10 $\mu$m which would serve as a negative electrode collector. After the coated web-shaped copper foil was dried, it was pressed into a web-shaped negative electrode by a roll press. The web-shaped negative electrode was then cut into a rectangular shape, producing a negative electrode 1, as shown in FIG. 5A.

The positive electrodes 2 were manufactured as follows:

Lithium carbonate and cobalt carbonate were mixed at a ratio of 0.5 mol: 1.0 mol, and the mixture was fired in air at 900° C. for 5 hours, producing $LiCoO_2$.

91 parts by weight of the $LiCoO_2$ thus produced were mixed with 6 parts by weight of an electric conductor of graphite and 3 parts by weight of a binder of polyvinylidene fluoride, preparing a positive electrode mixture. The positive electrode mixture was then dispersed into a solvent of N-methyl-2-pyrrolidone, producing a positive electrode slurry.

The positive electrode slurry was then coated uniformly on both surfaces of a web-shaped aluminum foil having a thickness of 20 µm which would serve as a positive electrode collector. After the coated web-shaped aluminum foil was dried, it was pressed into a web-shaped positive electrode by a roll press. The web-shaped positive electrode was then cut into a rectangular shape, producing a positive electrode 2, as indicated by the dotted lines in FIG. 5B.

Negative electrodes 1 and positive electrodes 2 thus fabricated were sandwiched by separators 3 each comprising a microporous polypropylene film, and fastened together by an adhesive tape 10, thereby producing a laminated electrode assembly.

Then, as shown in FIG. 10, an insulating sheet 11 was placed on an inner surface of the bottom wall of a battery case 12 of iron in the form of a hollow flat rectangular parallelepiped, the battery case 12 being plated with a nickel layer having a thickness of 450 µm, and the laminated electrode assembly was introduced into the battery case 12 through its open end 14 placed on the insulating sheet 11. The lands 12b are circular in shape when viewed in directions perpendicular to the side walls on which the lands 12b project.

Thereafter, an auxiliary lead 6 was welded to a positive electrode terminal 8 which had been mounted on a battery lid 9 through a gasket 7. Positive electrode leads 5 connected to the respective positive electrodes 2 are welded to the auxiliary leads 4. Negative electrode leads 6 connected to the respective negative electrodes 1 are welded to the battery lid 9.

An electrolyte of $LiPF_6$ was dissolved at a ratio of 1 mol/l into a mixture of 50% by volume of a solvent of propylene carbonate and 50% by volume of a solvent of dimethyl carbonate, preparing a nonaqueous electrolyte. The nonaqueous electrolyte was poured into the battery case 12, and then the battery lid 9 was affixed to the battery case 12 by laser beam welding, thereby completing a lithium ion secondary battery in the shape of a flat rectangular parallelepiped.

Inventive Example 11

A lithium ion secondary battery in the shape of a flat rectangular parallelepiped was produced in the same manner as with Inventive Example 10, except that a battery case in the form of a hollow flat rectangular parallelepiped with only one land 12b was used.

Inventive Example 12

A graphite material powder produced from a molded body of carbon for graphitization for use as a negative electrode material was manufactured as follows:

30 parts by weight of a binder of coal tar pitch was added to 100 parts by weight of a filler of coal coke, and they were mixed together at about 100° C. Thereafter, the mixture was pressed by a press, producing a precursor for a molded body of carbon. The precursor was then heated at a temperature of 1000° C. or lower, thereby producing a molded body of carbon. The molded body of carbon was impregnated with a binder pitch that had been melted at a temperature of 200° C. or lower, and then fired at a temperature of 1000° C. or lower. Such an impregnating and firing process was repeated several times. Thereafter, the molded body of carbon was heated at 2600° C. in an inert atmosphere, producing a graphitized molded body, which was crushed and classified into a graphite material powder.

The produced graphite material powder had a true density of 2.23 $g/cm^3$, a bulk specific gravity of 0.83 $g/cm^3$, an average shape parameter Xave of 10, a specific surface area of 4.4 $m^2/g$, an average particle diameter of 31.2 µm, a cumulative 10% particle diameter of 12.3 µm, a cumulative 50% particle diameter of 29.5 µm, and a cumulative 90% particle diameter of 53.7 µm.

Except that the graphite material powder was used as a negative electrode material, a lithium ion secondary battery in the shape of a flat rectangular parallelepiped was produced in the same manner as with Inventive Example 10.

Inventive Example 13

A lithium ion secondary battery in the shape of a flat rectangular parallelepiped was produced in the same manner as with Inventive Example 10, except that the same negative electrode material as with Inventive Example 12 was used, and a battery case in the form of a hollow flat rectangular parallelepiped with only one land 12b was used.

Comparative Example 8

A lithium ion secondary battery in the shape of a flat rectangular parallelepiped was produced in the same manner as with Inventive Example 10, except that a battery case in the form of a hollow flat rectangular parallelepiped free of any lands was used.

Comparative Example 9

A lithium ion secondary battery in the shape of a flat rectangular parallelepiped was produced in the same manner as with Inventive Example 12, except that a battery case in the form of a hollow flat rectangular parallelepiped free of any lands was used.

The lithium ion secondary batteries according to Inventive Examples 10–13 and Comparative Examples 8, 9 were charged with a constant current of 400 mA at a constant voltage of 4.2 V for 5 hours, thereafter discharged with a constant current of 400 mA down to a voltage of 2.75 V, and then measured for an initial battery capacity The lithium ion secondary batteries were also measured for a battery case thickness after they were charged at 4.2 V and then kept at 90° C. The measured data are shown in Table 3 below.

TABLE 3

|  | VI | VII | VIII |
|---|---|---|---|
| In. Ex. 10 | 802 | 7.80 | 0.23 |
| In. Ex. 11 | 802 | 7.70 | 0.43 |
| In. Ex. 12 | 992 | 7.85 | 0.25 |
| In. Ex. 13 | 993 | 7.75 | 0.42 |
| Co. Ex. 8 | 801 | 7.64 | 0.63 |
| Co. Ex. 9 | 990 | 8.15 | 0.55 |

VI: Initial capacity (mAh)
VII: Battery case thickness after being charged at 4.2 V (mm)
VIII: Increase in the battery case thickness after being kept at 90° C. for one day (mm)

battery thickness after being charged at 4.2 V, referred to in Table 3 above, is the measured maximum thickness of the battery between the crests of the lands 12b.

The increase in the battery case thickness after being kept at 90° C. for one day, referred to in Table 3 above, is the measured difference between the thickness of the charged battery after being kept at 90° C. for one day and the battery thickness after being charged at 4.2 V.

It can be seen from Table 3 that the batteries according to Comparative Examples 8, 9 had relatively large values of 0.63 mm and 0.55 mm, respectively, with respect to the increase in the battery case thickness, whereas the batteries according to Inventive Examples 10–13 had vary small values in the range from 0.23 mm to 0.43 mm with respect to the increase in the battery case thickness.

When a nonaqueous-electrolyte secondary battery is kept at 90° C. for one day, the vapor pressure of the solvent in the electrolyte increases, developing an internal pressure buildup in the battery. The internal pressure buildup further rises when the solute of the electrolyte is decomposed and gasified.

As a result, the increases in the battery case thickness of the batteries according to Comparative Examples 8, 9 which are free of lands on the battery cases are of relatively large values. The battery cases of the batteries according to Inventive Examples 10 through 13 are prevented from being unduly deformed even under an internal pressure buildup because the battery cases are reinforced with the lands on the wide side walls thereof.

It can be seen, therefore, that even when the nonaqueous-electrolyte secondary battery according to the third embodiment of the present invention is kept at 90° C., the thickness of the battery case suffers only a small increase, and hence the nonaqueous-electrolyte secondary battery is highly reliable when kept at high temperatures.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. A nonaqueous-electrolyte secondary battery comprising:
   an electrode assembly having positive and negative electrodes separated from each other by a separator; and
   a battery case having a side wall with at least one land projecting inwardly into the battery case, said electrode assembly being disposed in said battery case.

2. A nonaqueous-electrolyte secondary battery according to claim 1, wherein said battery case has an inside case width along a direction across said side wall, said inside case width being at least 0.3 times and less than 1.09 times a thickness of said electrode assembly.

3. A nonaqueous-electrolyte secondary battery according to claim 1, wherein the negative electrode is made of a carbon material which can be doped or undoped with lithium ions, and the positive electrode is made of a material expressed by $Li_xMO_y$ where M represents at least one material selected from the group consisting of Co, Ni, Mn, Fe, Al, V, and Ti, further comprising an electrolyte held in said battery case.

4. A nonaqueous-electrolyte secondary battery according to claim 1, wherein the negative electrode is made of a graphite material which can be doped or undoped with lithium ions, and the positive electrode is made of a material expressed by $Li_xMO_y$ where M represents at least one material selected from the group consisting of Co, Ni, Mn, Fe, Al, V, and Ti, further comprising an electrolyte held in said battery case.

5. A nonaqueous-electrolyte secondary battery comprising:
   an electrode assembly having positive and negative electrodes separated from each other by a separator; and
   a battery case made of sheet metal having four rectangular side walls and a rectangular bottom, said case having means limiting expansion of the case due to internal pressure, said means comprising a plurality of round corners for joining each adjacent two of said side walls and joining each side wall to the bottom.

6. A nonaqueous-electrolyte secondary battery according to claim 5, wherein said separator is made of a porous resin material, further comprising a nonaqueous electrolyte held in said battery case.

7. A nonaqueous-electrolyte secondary battery according to claim 6, wherein said nonaqueous electrolyte contains at least one material selected from the group consisting of ethylene carbonate, propylene carbonate, butylene carbonate, vinylene carbonate, sulfolanes, butyrolactones, valerolactones, diethyl carbonate, dimethyl carbonate, methyl ethyl carbonate, and methyl propyl carbonate.

8. A nonaqueous-electrolyte secondary battery according to claim 5, wherein the negative electrode is made of a carbon material which can be doped or undoped with lithium ions, and the positive electrode is made of a material expressed by $Li_xMO_y$ where M represents at least one material selected from the group consisting of Co, Ni, Mn, Fe, Al, V, and Ti, further comprising an electrolyte held in said battery case.

9. A nonaqueous-electrolyte secondary battery according to claim 5, wherein the negative electrode is made of a graphite material which can be doped or undoped with lithium ions, and the positive electrode is made of a material expressed by $Li_xMO_y$ where M represents at least one material selected from the group consisting of Co, Ni, Mn, Fe, Al, V, and Ti, further comprising an electrolyte held in said battery case.

10. A nonaqueous-electrolyte secondary battery comprising:
    an electrode assembly having positive and negative electrodes separated from each other by a separator; and
    a battery case having a side wall with at least one land projecting outwardly from the battery case, said electrode assembly being disposed in said battery case.

11. A nonaqueous-electrolyte secondary battery according to claim 10, wherein said separator is made of a porous resin material, further comprising a nonaqueous electrolyte held in said battery case.

12. A nonaqueous-electrolyte secondary battery according to claim 10, wherein the negative electrode is made of a carbon material which can be doped or undoped with lithium ions, and the positive electrode is made of a material expressed by $Li_xMO_y$ where M represents at least one material selected from the group consisting of Co, Ni, Mn, Fe, Al, V, and Ti, further comprising an electrolyte held in said battery case.

13. A nonaqueous-electrolyte secondary battery according to claim 10, wherein the negative electrode is made of a graphite material which can be doped or undoped with lithium ions, and the positive electrode is made of a material expressed by $Li_xMO_y$ where M represents at least one material selected from the group consisting of Co, Ni, Mn, Fe, Al, V, and Ti, further comprising an electrolyte held in said battery case.

* * * * *